July 23, 1940.   E. M. DIEHL   2,208,963
DEVICE FOR WINDING INSULATING MATERIAL ON CABLES
Filed Dec. 22, 1938    4 Sheets-Sheet 1
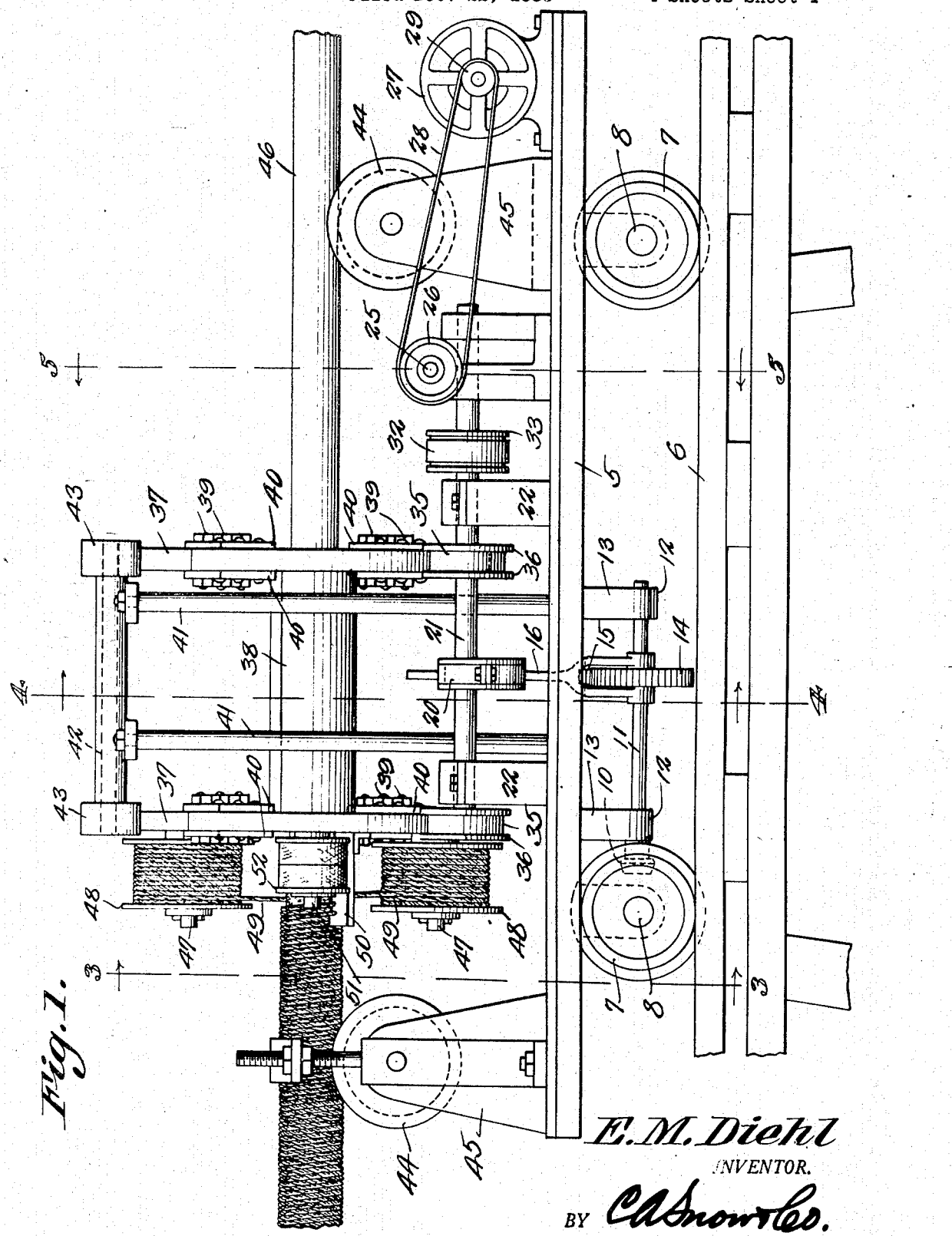
E. M. Diehl
INVENTOR.
BY C. A. Snow & Co.
ATTORNEYS.

July 23, 1940.　　　　　E. M. DIEHL　　　　　2,208,963
DEVICE FOR WINDING INSULATING MATERIAL ON CABLES
Filed Dec. 22, 1938　　　　4 Sheets-Sheet 2
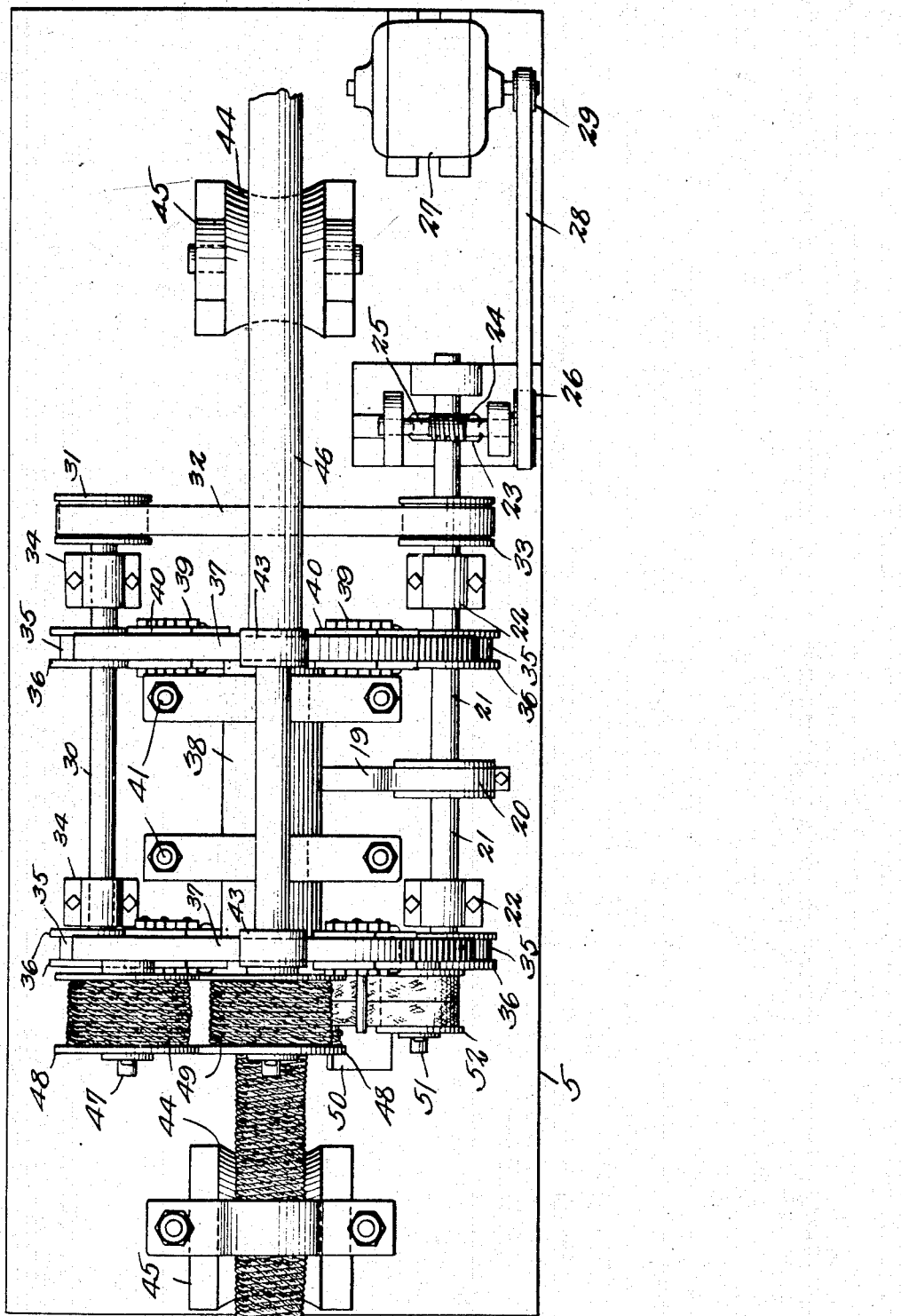
E. M. Diehl INVENTOR.
BY C. A. Snow & Co.
ATTORNEYS.

July 23, 1940.   E. M. DIEHL   2,208,963
DEVICE FOR WINDING INSULATING MATERIAL ON CABLES
Filed Dec. 22, 1938   4 Sheets-Sheet 3
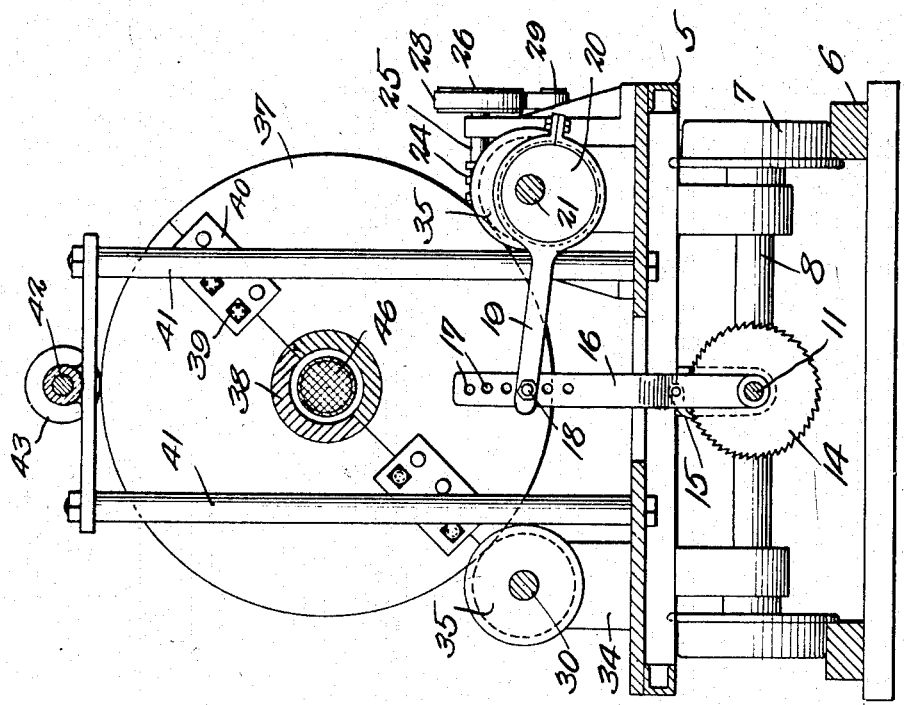
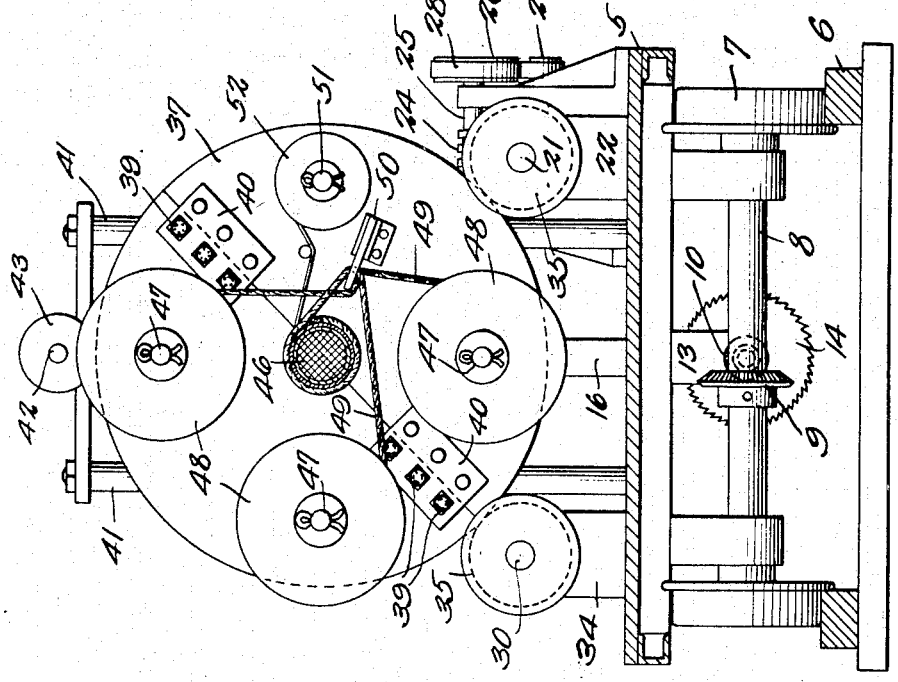
E. M. Diehl
INVENTOR.
BY
ATTORNEYS.

July 23, 1940.  E. M. DIEHL  2,208,963
DEVICE FOR WINDING INSULATING MATERIAL ON CABLES
Filed Dec. 22, 1938  4 Sheets-Sheet 4
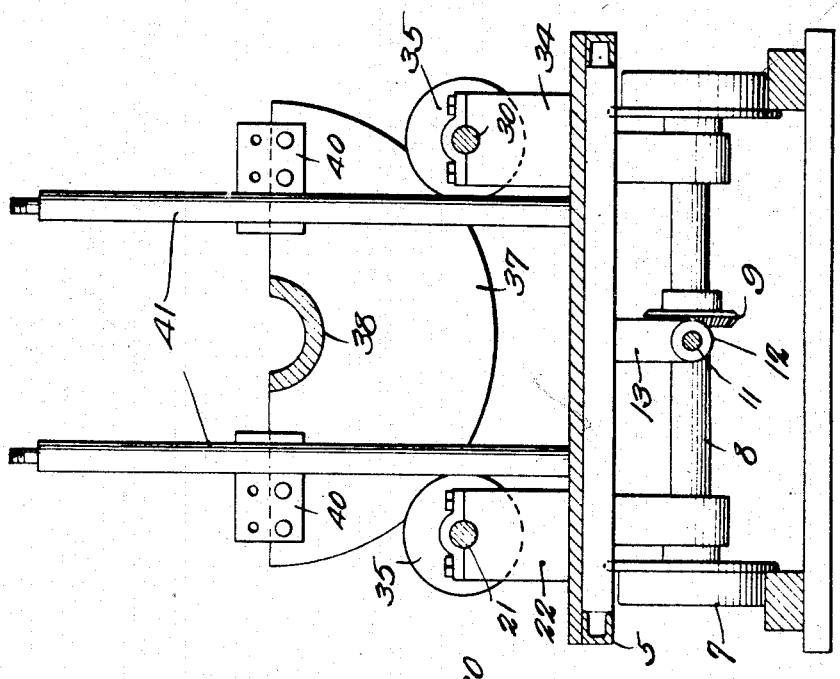
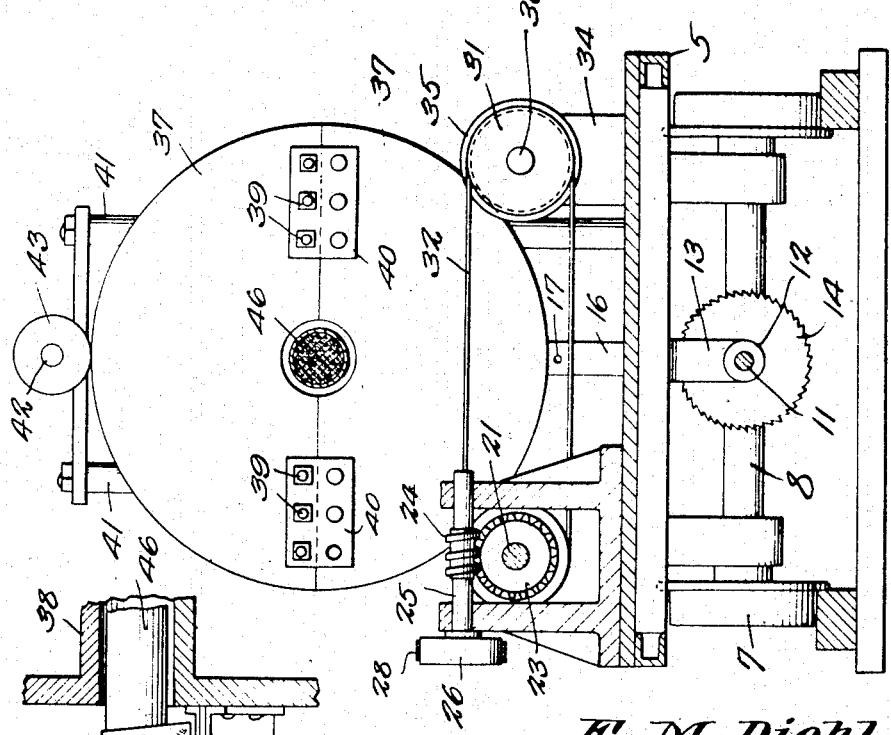
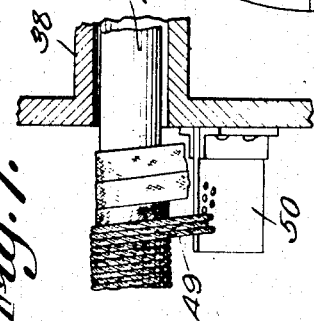
E. M. Diehl
INVENTOR.
BY
ATTORNEYS.

Patented July 23, 1940

2,208,963

UNITED STATES PATENT OFFICE 2,208,963

DEVICE FOR WINDING INSULATING MATERIAL ON CABLES

Edward M. Diehl, Bath, Pa.

Application December 22, 1938, Serial No. 247,271

2 Claims. (Cl. 57—10)

This invention relates to a machine of the portable type designed for use in repairing and recovering electric cables, to the end that cables that would otherwise be discarded as scrap material, may be reconditioned at a nominal expense, resulting in a material savings in the cost and maintenance of electric cables.

The primary object of the invention is to provide a machine for recovering cables, which will operate to accurately wind insulating tapes and wire or twine around the cables renewing worn-out defective cable insulation.

Another object of the invention is to provide a machine of this character which will permit a cable undergoing repair, to be readily and easily positioned on the machine.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of a machine constructed in accordance with the invention.

Figure 2 is a plan view thereof.

Figure 3 is a sectional view taken on line 3—3 of Figure 1.

Figure 4 is a sectional view taken on line 4—4 of Figure 1.

Figure 5 is a sectional view taken on line 5—5 of Figure 1.

Figure 6 is an end elevational view of the machine illustrating one-half of each of the ends of the main spool or power disks of the machine, as removed to permit the cable to be positioned within the machine, with facility.

Figure 7 is fragmental detail view illustrating the twine or wire guides, and illustrating the tape and twine as being wound on the cable.

Referring to the drawings in detail, the device comprises a carriage indicated by the reference character 5, which is mounted on the track 6. The carriage embodies wheels 7 mounted on axles 8, one of the axles being supplied with the pinion 9 that meshes with pinion 10 disposed at one end of the shaft 11, which in turn is mounted in the bearings 12 carried at the lower ends of the arms 13.

Mounted on the shaft 11 is a ratchet wheel 14 that is engaged by the pawl 15 carried by the arm 16. The arm 16 is formed with a plurality of spaced openings 17 through which the bolt 18 extends, the bolt providing an adjustable connection between the arm 19 and eccentric 20 which is mounted on the power shaft 21, to move therewith. Thus it will be seen that due to this construction, the eccentric 20 will operate to rock the arm 16, and consequently intermittently rotate ratchet wheel 14 to feed the carriage along the track, at a predetermined slow rate of speed.

The power shaft 21 is mounted in the bearing arms 22, the power shaft being supplied with a worm gear 23 meshing with the worm gear 24 of the shaft 25, the shaft 25 being provided with a pulley 26 that receives motion from the motor 27, through the belt 28 operating over the pulley 26 and pulley 29 mounted on the motor shaft. Arranged in parallel relation with the shaft 21 and disposed on the opposite side of the carriage 5, is a shaft 30 on which the pulley 31 is mounted which receives motion from the shaft 21, through the belt 32 that operates over pulley 31 and pulley 33, the pulley 33 being secured to shaft 21.

The shaft 30 is mounted in the bearing members 24 rising from the carriage 5. Mounted on the shafts 21 and 30, are power disks 35 that are provided with spaced peripheral flanges 36, between which the disks 37 of the substantially large spool 38 operates, the disks 35 acting to transmit rotary movement to the large spool 38 to accomplish the purpose of the invention.

These disks 37 embody removable sections which are bolted together as by means of the bolts 39 and plates 40, so that the sections of the disks 37 may be disconnected, for positioning the device over a cable to be rewound or repaired.

Posts 41 extend upwardly from the carriage, and provide a support for the shaft 42 that carries rollers 43 at the ends thereof, the rollers 43 engaging the disks 37, at points near the upper edges thereof, holding the disks 37 to the power disks 35.

Substantially large rollers 44 are mounted on the bearing members 45 that are bolted to the carriage 5, the rollers 44 having grooved peripheries to receive the cable being recovered.

It will of course be understood that the cable which is being repaired, extends through the large spool 38 and is so arranged that the large spool 38 may rotate around the cable 46, to accomplish the purpose of the invention. Extending laterally from the disk at one end of the large spool 38 are shafts 47 on which the spools 48 are mounted, the spools 48 supporting the twine or wire indicated at 49, and which is being wrapped around the cable. The twine or wire 49 passes through openings of the guide plate 50, the openings being arranged in such a way that the twine or wire will wind evenly over the cable.

Mounted on the shaft 51, is a spool 52 on which the wide insulating tape is held, the position of the spool 52 with respect to the spools 48, being such that the tape will be wound on the cable, prior to the positioning or winding of the twine or wire 49 thereon.

From the foregoing it will be seen that due to the construction shown and described, the substantially large spool 38 in rotating around the cable, will wrap the wide insulating tape on the cable, and the tape will be covered by the windings of the twine or wire 49, thereby providing a durable insulation for the cable to permit the further use of the cable.

It will of course be understood that the operation of the device is carried out by the motor 27, which is geared to the mechanism of the device in such a way that the carriage will be moved along its track gradually, and the substantially large spool will rotate slowly to insure a true winding of the insulating material on the cable being repaired.

What is claimed is:

1. A cable wrapping apparatus, comprising a carriage, a pair of parallel shafts mounted on the carriage and arranged in spaced relation with respect to each other, pairs of grooved pulleys mounted on said shafts, a main spool embodying split disk-like end members each having a central opening for the reception of the cable under treatment, a plurality of spools containing wires, mounted on one of the disk-like end members and adapted to deliver material used in wrapping the cable under treatment, a guide plate through which material from the last mentioned spools is guided to the cable, means for holding the main spool in position, the end members of the main spool resting in the grooves of the pairs of grooved pulleys, and means for applying power to rotate the main spool, whereby material is wound on the cable, from the main spool.

2. A cable wrapping apparatus comprising a movable support, a pair of spaced parallel shafts mounted on the support, grooved pulleys mounted on the shafts and disposed opposite to each other, a main pulley embodying end members fitted in the grooves of said pulleys, said main pulley having a central opening through which the cable under treatment extends, supporting rollers mounted on the carriage at opposite ends of the main spool and on which the cable rests, a plurality of spools mounted on one of said end members, a guide member on the main spool and over which material moves from the last mentioned spools to the cable, and removable members including rollers engaging the ends of the main spool, normally holding the main spool into close engagement with the grooved pulleys.

EDWARD M. DIEHL.